US012262076B2

(12) United States Patent
Gupta et al.

(10) Patent No.: US 12,262,076 B2
(45) Date of Patent: *Mar. 25, 2025

(54) SYSTEMS AND METHODS FOR MODIFYING CONTENT RECOMMENDATIONS BASED ON CONTENT AVAILABILITY ON OTHER PLATFORMS

(71) Applicant: Adeia Guides Inc., San Jose, CA (US)

(72) Inventors: Vikram Makam Gupta, Karnataka (IN); Vishwas Sharadanagar Panchaksharaiah, Tumkur District (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/425,614

(22) Filed: Jan. 29, 2024

(65) Prior Publication Data

US 2024/0171800 A1    May 23, 2024

Related U.S. Application Data

(63) Continuation of application No. 16/357,246, filed on Mar. 18, 2019, now Pat. No. 11,930,233.

(51) Int. Cl.
H04N 21/231    (2011.01)
H04N 21/235    (2011.01)
H04N 21/24    (2011.01)
H04N 21/25    (2011.01)
H04N 21/258    (2011.01)
H04N 21/262    (2011.01)
H04N 21/2665    (2011.01)
(Continued)

(52) U.S. Cl.
CPC ..... *H04N 21/2665* (2013.01); *H04N 21/2353* (2013.01); *H04N 21/26258* (2013.01); *H04N 21/26283* (2013.01); *H04N 21/4622* (2013.01)

(58) Field of Classification Search
None
See application file for complete search history.

(56) References Cited

U.S. PATENT DOCUMENTS 9,648,088 B1 *   5/2017   Pande ............... G06Q 30/0252
2007/0083520 A1 *   4/2007   Shellen ............... G06F 16/958
(Continued)

OTHER PUBLICATIONS

U.S. Appl. No. 16/357,246, filed Mar. 18, 2019, Vikram Makam Gupta.

*Primary Examiner* — Brian T Pendleton
*Assistant Examiner* — Jean D Saint Cyr
(74) *Attorney, Agent, or Firm* — Haley Guiliano LLP

(57) ABSTRACT

Systems and methods are described herein for modifying content recommendations based on what content items will be available on content platforms to which the user will have access during a trip. Content items to be recommended to the user on a first content platform are identified by comparing characteristics of each available content item to a profile associated with the user. A second content platform to which the user will have access during a particular time period in the near future is also identified. The second content platform is queried to identify content items that will be available during the particular time period. If any content item available on the second content platform during the particular time period also appears in the set of content items identified for recommendation, recommendation of that content item is suppressed.

20 Claims, 10 Drawing Sheets

(51) Int. Cl.
*H04N 21/43* (2011.01)
*H04N 21/454* (2011.01)
*H04N 21/462* (2011.01)
*H04N 21/466* (2011.01)
*H04N 21/482* (2011.01)

(56) References Cited

U.S. PATENT DOCUMENTS

2009/0165051 A1* 6/2009 Armaly .............. H04N 21/4316
 725/40
2013/0332839 A1* 12/2013 Frazier ............... H04N 21/4756
 715/738
2016/0269473 A1* 9/2016 Bhogal ................. H04L 67/535

* cited by examiner

SYSTEMS AND METHODS FOR MODIFYING CONTENT RECOMMENDATIONS BASED ON CONTENT AVAILABILITY ON OTHER PLATFORMS

CROSS-REFERENCE TO RELATED APPLICATIONS

This application is a continuation of U.S. patent application Ser. No. 16/357,246, filed Mar. 18, 2019. The disclosure of which is hereby incorporated by reference herein in its entirety.

BACKGROUND

The present disclosure relates to content delivery and consumption platforms and, more particularly, recommending or suppressing recommendation of particular content items based on the availability of such content items on other platforms at a relevant future time.

SUMMARY

When looking for content to watch, users often refer to recommendations provided by a content platform. Traditionally, content platforms provide recommendations based on a user's past viewing history, specified user preferences, or some combination thereof. This provides the user with targeted content recommendations that are determined to be of interest to the user. Such recommendations may include both movies and television shows, including both individual episodes and entire seasons. Content platforms are also available on commercial airlines and other transportation systems as well as in hotels. These systems provide a limited collection of content items for passengers to watch during transit or vacation, but often include some content that is available on content platforms used by the user at home. For example, the user is interested in watching "The Hobbit." If the user watches "The Hobbit" then he or she may not have anything else of interest to watch while on vacation or during transit. As another example, a user may be flying from New York to Dubai. Flight time is scheduled to be twelve hours and fifteen minutes. A content platform available on the airplane may provide all episodes of the third season of the series "Game of Thrones," having a total runtime of approximately ten hours and ten minutes. If the user has already watched the entire third season of "Game of Thrones" and there is no other content that interests the user available on the airplane, the user will have nothing to watch during the flight. Thus, recommendations provided to the user at home or on his or her mobile device should account for upcoming times when the user will have access to other content platforms and modify content recommendations to prevent the user from consuming content available on those other content platforms.

Systems and methods are described herein for modifying content recommendations based on what content items will be available on content platforms to which the user will have access during a trip. Content items to be recommended to the user on a first content platform are identified by comparing characteristics of each available content item to a profile associated with the user. For example, the profile may include specific content characteristics preferred by the user or a listing of content previously watched by the user. Characteristics of each available content item are compared with the preferred content characteristics or with characteristics of recently-watched content to determine if a particular content item should be recommended. Once a set of content items have been identified for recommendation, but before recommendations are generated for the user, a second content platform to which the user will have access during a particular time period in the near future is identified. The second content platform is queried to identify content items that will be available during the particular time period. If any content item available on the second content platform during the particular time period also appears in the set of content items identified for recommendation, recommendation of that content item is suppressed. In some embodiments, it is first determined whether the first content platform will also be available during the particular time period. If so, recommendation of certain content items may be temporarily suppressed until the particular time period begins. For example, if the particular period of time represents travel time between two locations, recommendation of content items having a duration less than or equal to the duration of the particular period of time may be suppressed until the travel begins.

The system may access calendar data associated with the profile in order to determine the particular time period. For example, calendar data may identify an arrival time at a location and a departure time from the location. As another example, calendar data may identify flight information, including scheduled departure and arrival times. The system defines the particular time period based on the calendar data.

The system may identify another content platform that will be available during transit between the first location and the second location. The system may then identify content items that will be available on the second content platform during the particular time period by transmitting a query to a content provider of the second content platform including a start time and an end time corresponding to the particular time period. The system receives metadata corresponding to a listing of content items that will be available on the second content platform during the particular time period. The system identifies at least one content item available on the first content platform that will be available on the second content platform during the particular time period by comparing the content items identified for recommendation with the content items that will be available on the second content platform and determining a subset of matching content items. The system may also compare the metadata to the profile associated with the user to determine if any content items that will be available on the second content platform are of interest to the user.

To suppress recommendation of any matching content items, the system removes the matching content items form the list of content items identified for recommendation. Alternatively, the system may generate recommendations for the matching content items and then place an overlay over each matching content item to visually distinguish those content items from content items that are not available on the second content platform. If a selection of a content item corresponding to the at least one content item is received, the system generates for display a notification that the selected content item will be available on the second content platform during the particular time period.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
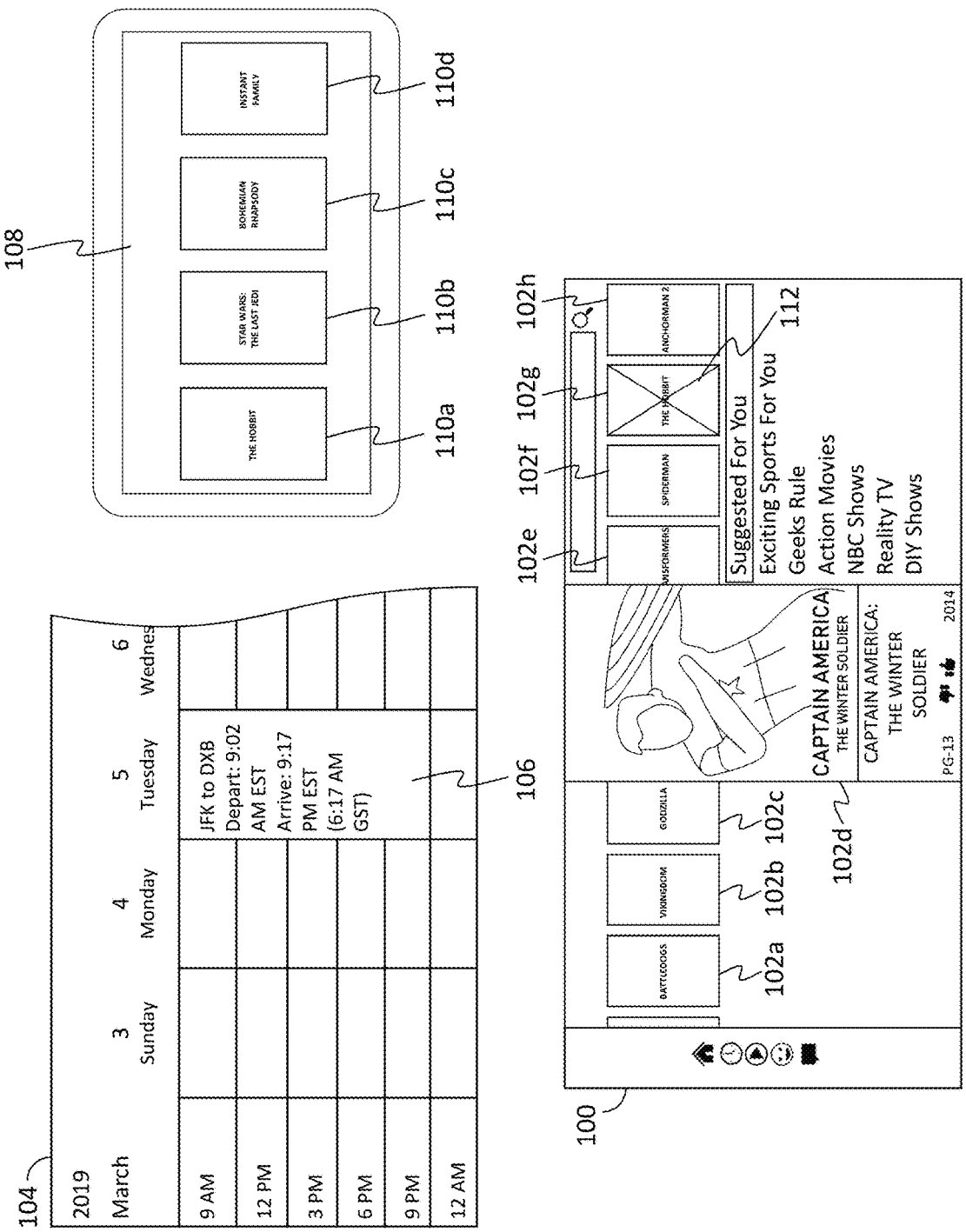
FIG. 1 shows a generalized embodiment of a content platform on which a recommendation engine may be employed in accordance with some embodiments of the disclosure.

FIG. 1 shows a generalized embodiment of a content platform on which a recommendation engine may be employed in accordance with some embodiments of the disclosure. Content platform 100 is available to the user in his or her home or on his or her mobile device. Content platform 100 provides content recommendations 102a-102h for content items available on content platform 100 which may be of interest to the user. For example, content platform 100 may compare characteristics or attributes (e.g., genre, actors) of content items previously watched by the user with characteristics or attributes of other available content items to identify content items with matching (i.e., similar) characteristics or attributes. Content platform 100 also accesses calendar data 104 associated with a profile of the user. Calendar data 104 may include travel information 106, such as a scheduled airline flight. Upon detecting the travel information, content platform 100 identifies a second content platform 108 that will be available to the user during travel. Content platform 100 retrieves metadata of content items 110a-110d available on the second content platform 108 and compares it with metadata of the content items corresponding to content recommendations 102a-102h. If any recommended content item is also determined to be available on the second content platform, recommendation of that content item is suppressed. For example, a visual indicator 112 may be overlaid over an image or link corresponding to the particular content item. Alternatively, the image or link corresponding to the particular content item may be removed or omitted from a list of content items generated for display. In some cases, the content platform may determine the available content items on the second content platform prior to generating for display any recommendations, and the content platform altogether prevents recommendation of content items available on the second content platform.

Figure 2:
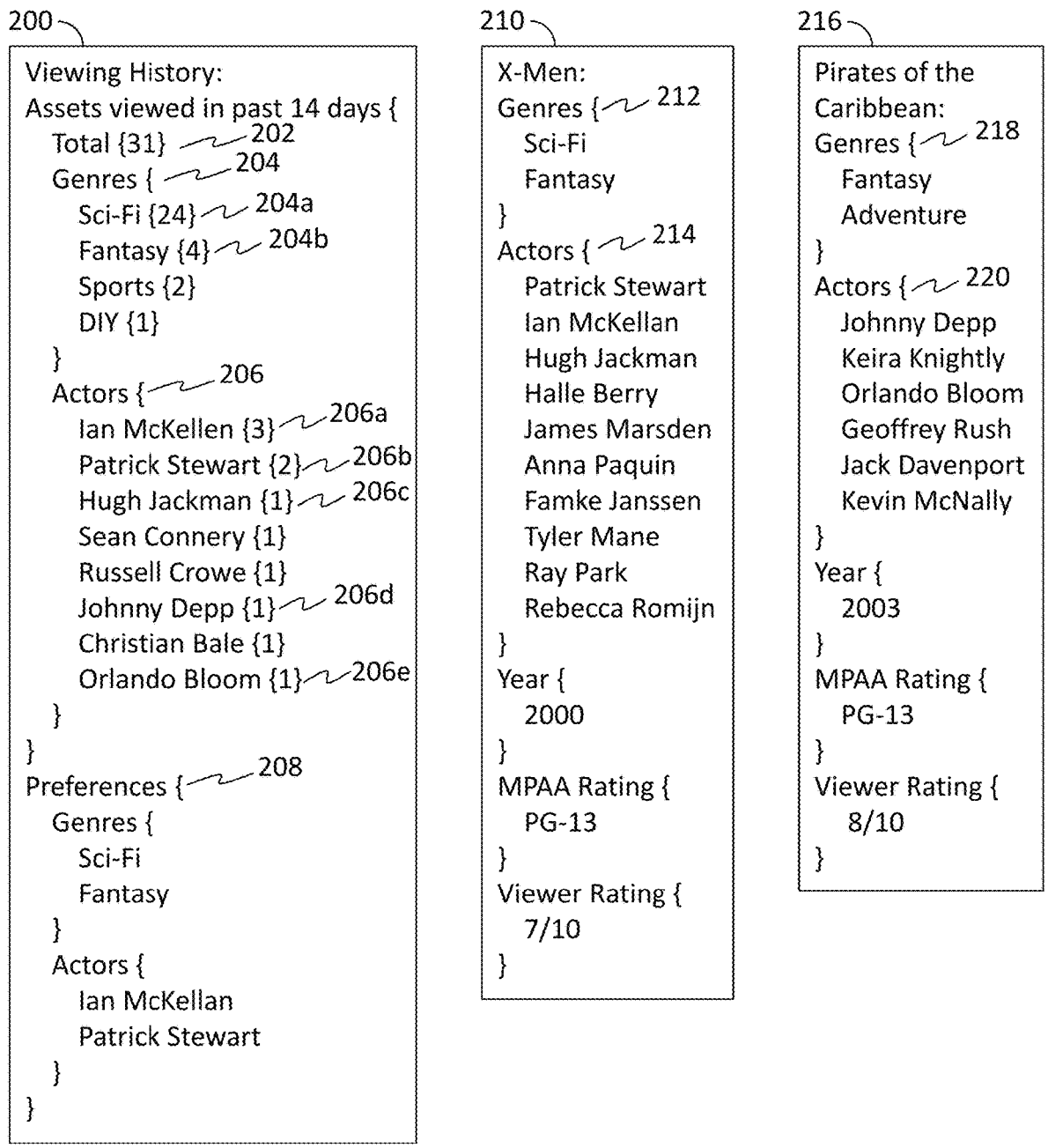
FIG. 2 shows an example of user profile data and metadata corresponding to content items in accordance with some embodiments of the disclosure.

FIG. 2 shows an example of user profile data 200 and metadata 210 and 216 corresponding to content items in accordance with some embodiments of the disclosure. User profile data 200 includes details regarding content items viewed for a past period of time, such as 14 days. For example, the user profile data 200 includes a total number of content items viewed in the past period of time 202, and the genres 204 represented in the total number 202. The user profile data 200 also includes actors 206 who have appeared in the content items viewed in the past period of time. User profile data 200 also includes preference data 208, which is determined, for example, based on genre data 204 and actor data 206. For example, genre data 204 includes data for several specific genres corresponding to the genres represented by the assets viewed in the past period of time. In the example of FIG. 2, sci-fi genre data 204a indicates that 24 sci-fi assets have been viewed in the past 14 days. Similarly, fantasy genre data 204b indicates that 4 fantasy assets have been viewed in the past 14 days. Sci-fi and fantasy being the genres with the highest values, preference data 208 indicates those genres as preferred by the user. Preference data 208 similarly includes preferred actors based on actors data 206, with data for actors Ian McKellen 206a and Patrick Stewart 206b having the highest values.

Metadata 210 corresponds to the movie "X-Men" and indicates genres 212 of sci-fi and fantasy. Metadata 210 also include actors 214 who appear in the movie "X-Men" including Patrick Stewart, Ian McKellen, and Hugh Jackman, who also appear in user profile data 200 (206a, 206b, and 206c, respectively). Based on this data, the content platform 100 might recommend "X-Men" to the user. Metadata 216 corresponds to the movie "Pirates of the Caribbean" and similarly include genres 218 and actors 220. Since genres 218 includes fantasy and actors 220 includes two actors who appear in user profile data 200, Johnny Depp (206d) and Orlando Bloom (206e), content platform 100 might also recommend "Pirates of the Caribbean" to the user.

Figure 3:
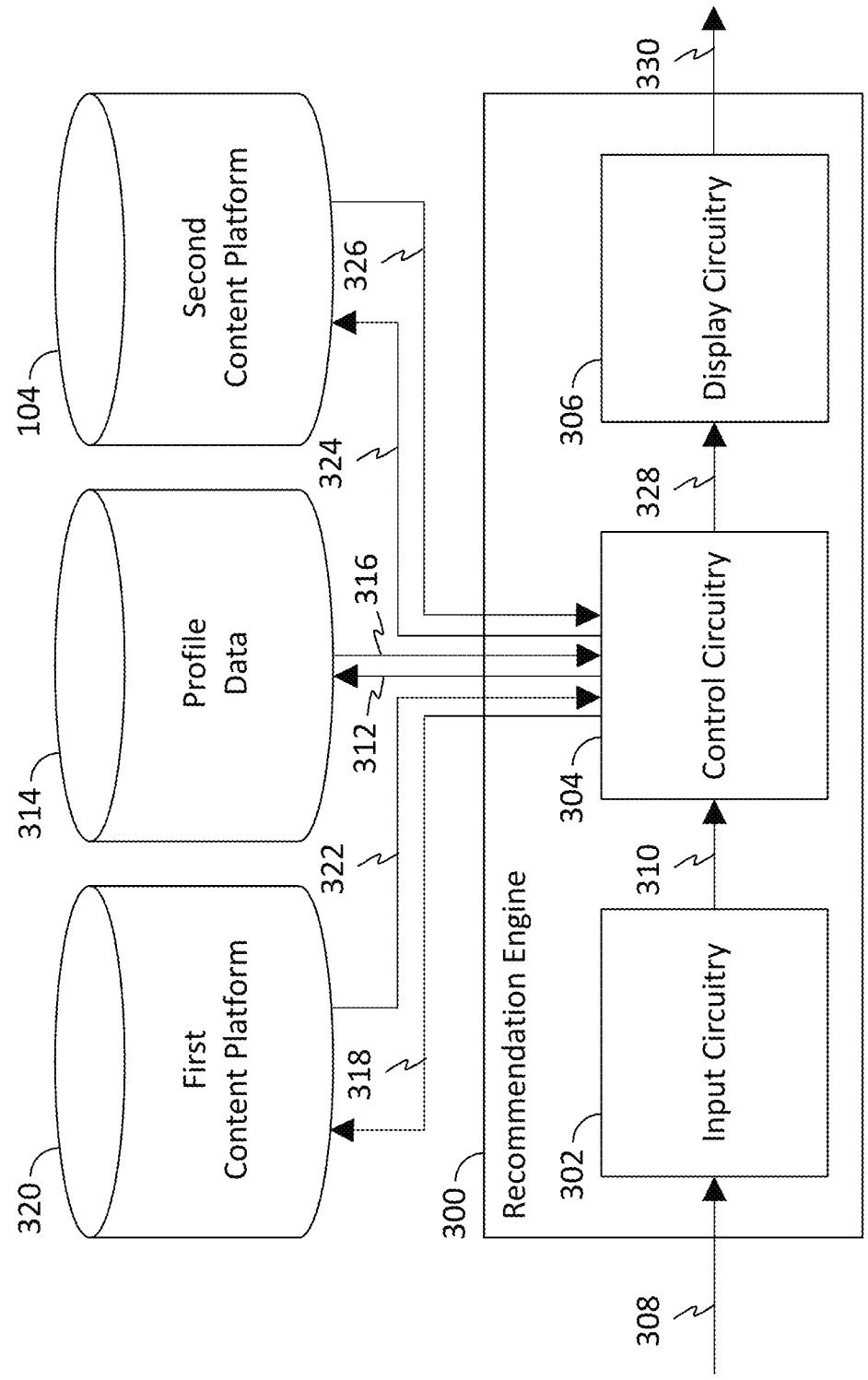
FIG. 3 is a block diagram representing control circuitry and data flow within a recommendation engine of the first content platform in accordance with some embodiments of the disclosure.

FIG. 3 is a block diagram representing control circuitry and data flow within a recommendation engine of the first content platform in accordance with some embodiments of the disclosure. Content platform 100 includes recommendation engine 300 which is responsible for providing content recommendations to the user. Recommendation engine 300 includes input circuitry 302, control circuitry 304, and display circuitry 306. Input circuitry 302 may include a microphone and voice processing circuitry for receiving voice commands, infrared receiving circuitry for receiving commands from a remote control device, a touchscreen interface for receiving user interaction with graphical user interface elements, or any combination thereof or any other suitable input circuitry for receiving any other suitable user input. Control circuitry 304 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Input circuitry 302 may be integrated with control circuitry 304.

Recommendation engine 300 may receive, using input circuitry 302, input 308 to provide content recommendations. Input circuitry 302 processes input 308 to determine a command associated with input 308. The command 310 is then transmitted to control circuitry 304. In response to the command 310 to provide content recommendations, control circuitry 304 transmits a request 312 to a profile database 314 for content preference characteristics of the user associated with a current profile. Control circuitry 304 receives profile data 316, comprising user profile data 200 and calendar data 104, in response to request 312. Control circuity 304 transmits a query 318 to a first content platform 320 (e.g., content platform 100) for content items having characteristics matching the content preference characteristics contained in profile data 316. Control circuitry 304 receives, from first content platform 320 in response to query 318, metadata 322 corresponding to a plurality of content items having characteristics matching the content preference characteristics.

Control circuitry 304 determines, based on profile data 316, whether the user is going to have access to a different content platform at any time between the current time and a particular amount of time in the future, such as one week. For example, control circuitry 304 identifies a scheduled flight in profile data 316 on an airline which provides in-flight entertainment systems. Control circuitry 304 identifies the in-flight entertainment system as the second content platform (e.g., second content platform 104) and transmits a query 324 to the second content platform 104 for metadata corresponding to content items that will be available to the user. The query 324 may identify a specific period of time based on the profile data 316. In some embodiments, the query 324 may only request content items having characteristics matching content preference characteristics in profile data 316. Control circuitry 304 receives, from the second content platform 104 in response to the query 324, metadata 326 corresponding to the content items that will be available on second content platform 104.

Control circuitry 304 compares metadata 326 to metadata 322 to determine whether any content item identified for recommendation to the user on the first content platform 320 will be available to the user on the second content platform 104. If control circuitry 304 identifies, based on the comparison, a content item identified for recommendation that will be available on the second content platform 104, control circuitry 304 suppresses recommendation of that content item. For example, control circuitry 304 may maintain a list, array, or other data structure in which identifiers of the recommended content items are stored. Control circuitry 304 may suppress recommendation of a particular content item by removing the identifier corresponding to the particular content item from the list, array or data structure. Alternatively, control circuitry 304 may flag the identifier of the particular content to receive an overlay indicating the availability of the particular content item on the second content platform.

After suppressing recommendation of content items, control circuitry 304 generates for display recommendations for the content items. Thumbnail images, text descriptions, and other visual elements 328 are transmitted to display circuitry 306, which combines the visual elements into a graphical interface with which the user will interact. Display circuitry 306 then outputs the graphical interface 330 to a media device of the user.

Figure 4:
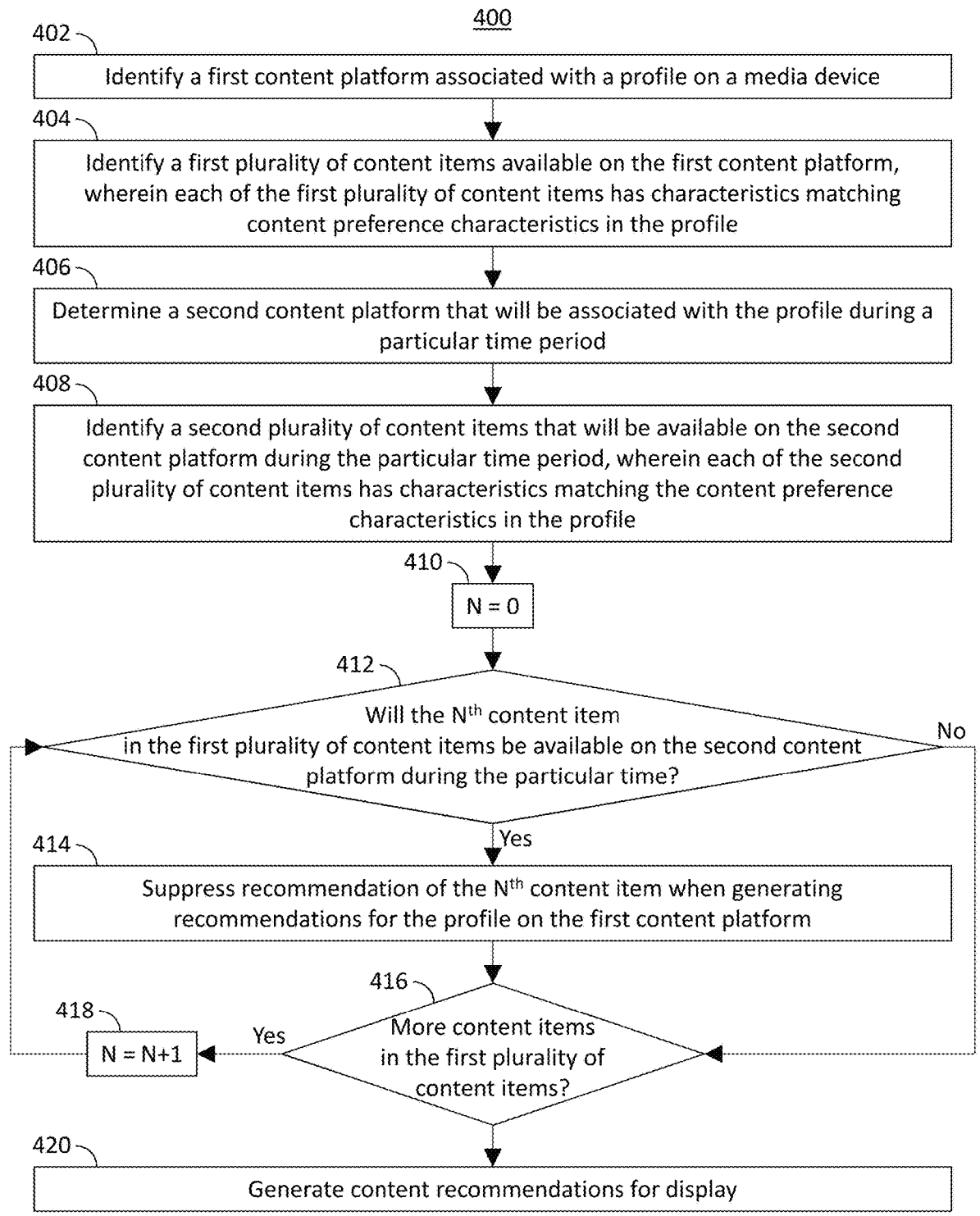
FIG. 4 is a flowchart representing a process for modifying content recommendations in accordance with some embodiments of the disclosure.

FIG. 4 is a flowchart representing an illustrative process 400 for modifying content recommendations in accordance with some embodiments of the disclosure. Process 400 may be implemented on control circuitry 304. In addition, one or more actions of process 400 may be incorporated into or combined with one or more actions of any other process or embodiment described herein.

At 402, control circuitry 304 identifies a first content platform associated with a profile on a media device. For example, control circuitry 304 identifies a content service account currently logged in on the media device on which recommendation engine 300 is employed. Alternatively, the media device on which recommendation engine 300 is employed may be directly associated with a single content platform.

At 404, control circuitry 304 identifies a first plurality of content items available on the first content platform, wherein each of the first plurality of content items has characteristics matching content preference characteristics in the profile. Control circuitry 304 queries a database associated with the first content platform to identify available content items which may be of interest to the user based on the profile data 316 as described above, or using any suitable method for identifying content items that may be of interest to a user.

At 406, control circuitry 304 determines a second content platform that will be associated with the profile during a particular time period. As described above, control circuitry 304 determines, based on profile data 316, that the user will be traveling and will have access to a second content platform during his or her travel. At 408, control circuitry 304 identifies a second plurality of content items that will be available on the second content platform during the particular time period, wherein each of the second plurality of content items has characteristics matching the content preference characteristics in the profile. This may be accomplished in a similar manner to the above-described identification of the first plurality of content items.

At 410, control circuitry 304 initializes a counter variable N and sets its value to 0. At 412, control circuitry 304 determines if the $N^{th}$ content item in the first plurality of content items will be available on the second content platform during the particular time. Control circuitry 304 compares the metadata of the $N^{th}$ content item in the first plurality of content items with corresponding metadata of each of the second plurality of content items to determine if the $N^{th}$ content item appears in both sets. If so, then, at 414, control circuitry 304 suppresses recommendation of the $N^{th}$ content item when generating recommendations for the profile on the first content platform as described above. At 416, control circuitry 304 determines whether there are additional content items in the first plurality of content items to compare with the second plurality of content items. If so, then, at 418, control circuitry 304 increments the value of counter variable N and processing returns to step 412. If all content items in the first plurality of content items have been compared with the second plurality of content items, the, at 420, control circuitry 304 generates content recommendations for display, as described above.

The actions or descriptions of FIG. 4 may be used with any other embodiment of this disclosure. In addition, the actions and descriptions described in relation to FIG. 4 may be done in suitable alternative orders or in parallel to further the purposes of this disclosure.

Figure 5:
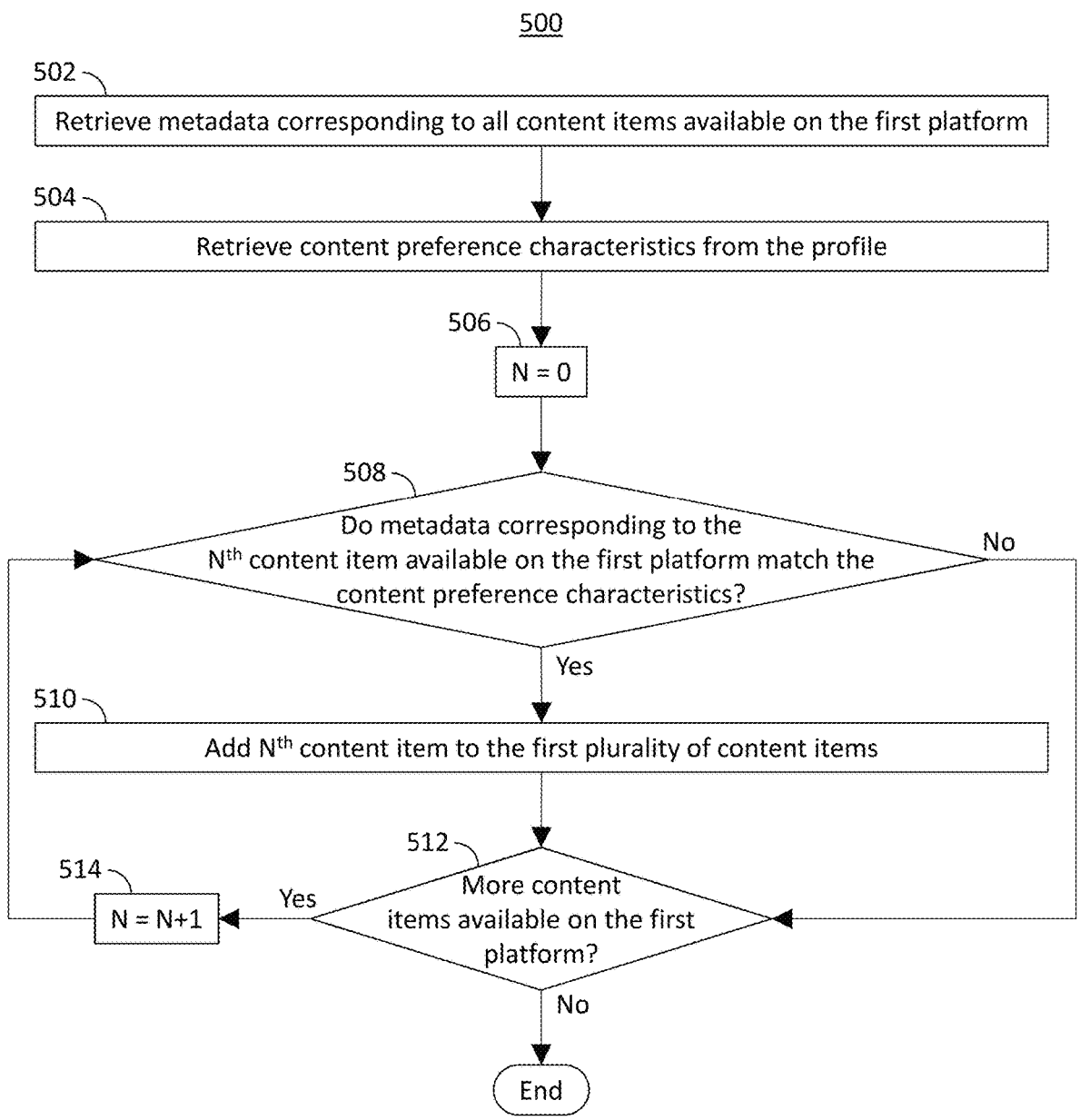
FIG. 5 is a flowchart representing a process for identifying content items for recommendation in accordance with some embodiments of the disclosure.

FIG. 5 is a flowchart representing an illustrative process for identifying content items for recommendation in accordance with some embodiments of the disclosure. Process 500 may be implemented on control circuitry 304. In addition, one or more actions of process 500 may be incorporated into or combined with one or more actions of any other process or embodiment described herein.

At 502, control circuitry 304 retrieves metadata corresponding to all content items available on the first platform. Control circuitry 304 transmits a query (e.g., query 318) to a database of content items available on the first content platform. For example, the query may be an SQL "SELECT" command. In response to the query, the database transmits a response comprising metadata for all content items currently available on the first content platform, which is received by control circuitry 304.

At 504, control circuitry 304 retrieves content preference characteristics from a user profile. Control circuitry 304 may access locally stored user profile information, or may transmit a query (e.g., query 312) to a user profile database. The query may include an identifier of the profile from which content preference characteristics are to be retrieved. In response to the query, the database transmits profile data (e.g., profile data 316), which is received by control circuitry 304.

At 506, control circuitry 304 initializes a counter variable N and sets its value to 0. At 508, control circuitry 304 determines whether metadata corresponding to the $N^{th}$ content items available on the first content platform matches the content preference characteristics. Control circuitry 304 extracts characteristics of the $N^{th}$ content item such as genre(s), actor(s), MPAA rating, and viewer rating from the metadata corresponding to the $N^{th}$ content item. Control circuitry 304 compares the extracted characteristics with preferences indicated in the profile data or calculated from historical viewing data contained in the profile data.

If control circuitry 304 determines that metadata corresponding to the $N^{th}$ content item available on the first content platform matched the content preference characteristics, the, at 510, control circuitry 304 adds the $N^{th}$ content item to the first plurality of content items. At 512, control circuitry 304 determines whether there are additional content items available on the first content platform. If so, then, at 514, control circuitry 304 increments the value of the counter variable N, and processing returns to step 508.

The actions or descriptions of FIG. 5 may be used with any other embodiment of this disclosure. In addition, the actions and descriptions described in relation to FIG. 5 may be done in suitable alternative orders or in parallel to further the purposes of this disclosure.

Figure 6:
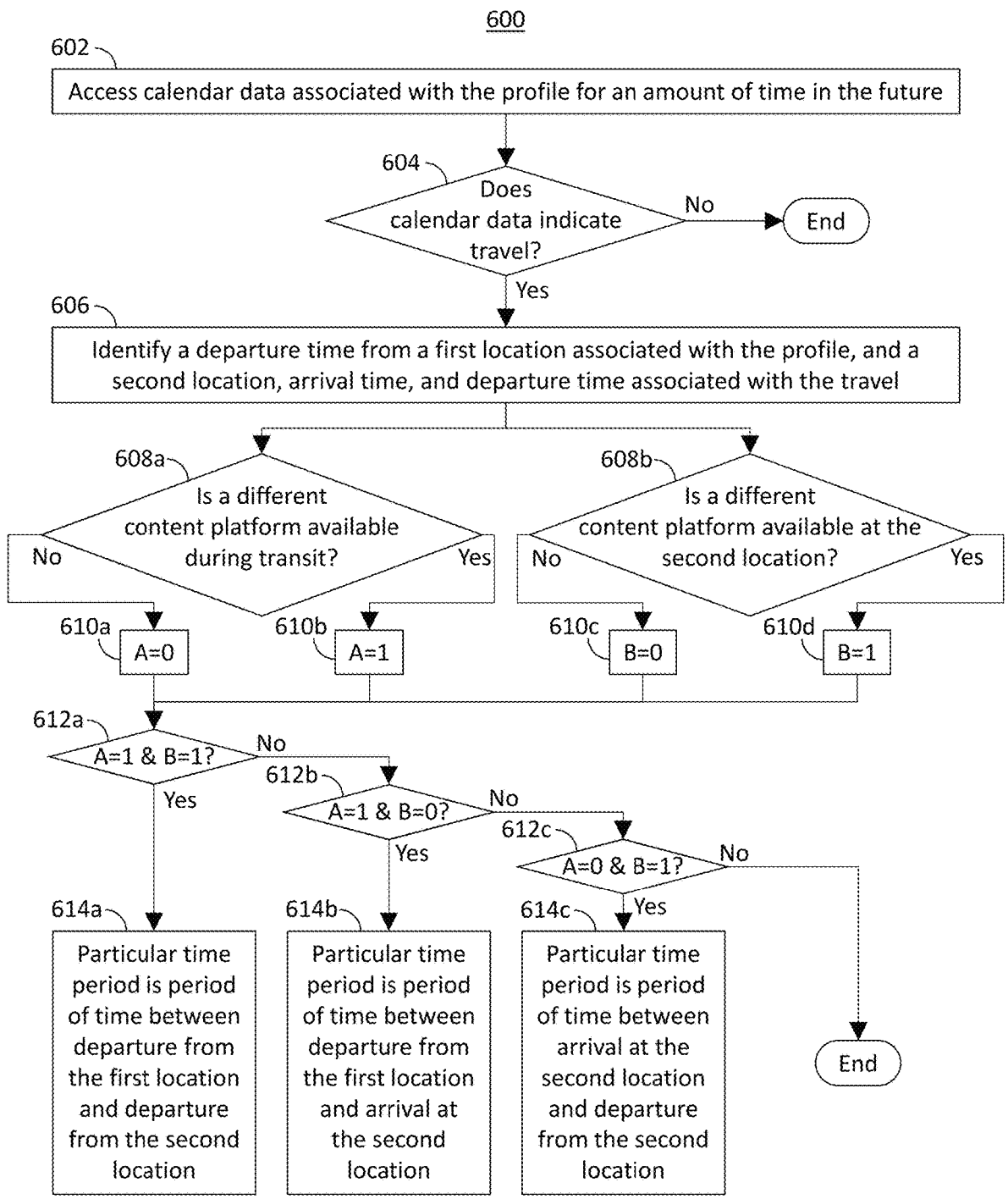
FIG. 6 is a flowchart representing a process for defining a particular time period for which content available on a second content platform is to be identified in accordance with some embodiments of the disclosure.

FIG. 6 is a flowchart representing an illustrative process 600 for defining a particular time period for which content available on a second content platform is to be identified in accordance with some embodiments of the disclosure. Process 600 may be implements on control circuitry 304. In addition, one or more actions of process 600 may be incorporated into or combined with one or more actions of any other process or embodiment described herein.

At 602, control circuitry 304 accesses calendar data associated with the profile for an amount of time in the future. For example, control circuitry 304 may access calendar data for the next seven days. Control circuitry 304 may transmit a query to the profile database 314 for calendar data for the next seven days. At 604, control circuitry 304 determines whether the calendar data indicates travel. Control circuitry 304 processes calendar data to identify travel-related entries such as flights and hotel reservations.

If the calendar data indicates travel, then, at 606, control circuitry 304 identifies a departure time from a first location associated with the profile, and a second location, arrival time, and departure time associated with the travel. Control circuitry 304 determines from the travel-related entries a time at which the user will begin travelling, such as a flight departure time. Control circuitry 304 also determines when the user will arrive at his or her destination, such as a flight arrival time or a hotel check-in time. Control circuitry 304 further determines the location the user is travelling to based on flight destination or hotel address information. Finally, control circuitry 304 determines when the user will leave the destination to return home based on hotel check-out time or return flight information.

At 608a, control circuitry 304 determines whether a different content platform will be available during transit. Control circuitry 304 identifies the operator of the particular method of transportation indicated in the calendar data, such as an airline. Control circuitry 304 then transmits a query (e.g., query 324) to, or otherwise accesses, a server associated with the identified operator to determine whether a content platform will be available to the user during transit. At 608b, whether a different content platform will be available at the second location (i.e., the user's destination). Similar to the above, control circuitry 304 identifies a particular hotel or property at which the user will be staying and transmits a query to or otherwise accesses a server associated with the hotel or property to determine if a content platform will be available to the user during his or her stay. If control circuitry 304 determines that a content platform will be available during transit, then at 610a, control circuitry 304 sets the value of a corresponding variable to 1. If no content platform will be available during transit, then at 610b, control circuitry sets the value of the corresponding variable to 0. If a content platform will be available during the user's stay at a hotel or other property, then ay 610c, control circuitry sets the value of a corresponding variable to 1. If no content platform is available at the hotel or property, then, at 610d, control circuitry sets the value of the corresponding variable to 0.

At 612a, if the values of both variables are set to 1, meaning that a content platform will be available both during transit and at the second location, then at 614a, control circuitry 304 defines the particular time period as the period between the user's departure from the first location and the user's departure from the second location. At 612b, if only the value of the variable corresponding to the availability of a content platform during transit is set to 1, then at 614b control circuitry 304 defines the particular time period as the period between the user's departure from the first location and the user's arrival at the second location. If only the value of the variable corresponding to the availability of a content platform at the second location is set to 1, then at 614c control circuitry 304 defines the particular time period as the period between the user's arrival at the second location and the user's departure from the second location.

The action and descriptions of FIG. 6 may be used with any other embodiment of this disclosure. In addition, the actions and descriptions described in relation to FIG. 6 may be done in suitable alternative orders or in parallel to further the purposes of this disclosure.

Figure 7:
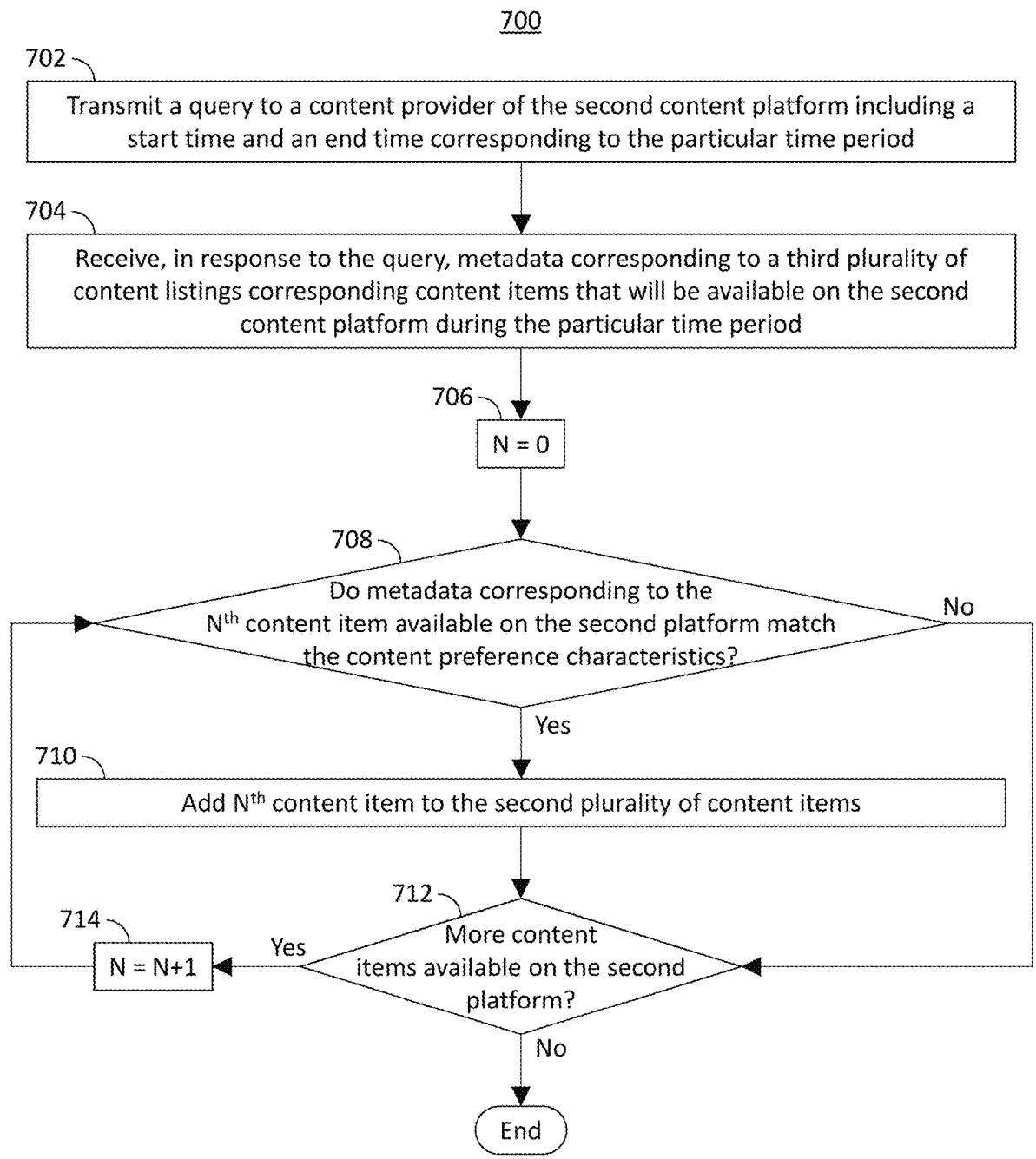
FIG. 7 is a flowchart representing a process for identifying content items available on a second content platform during a particular time period in accordance with some embodiments of the disclosure.

FIG. 7 is a flowchart representing an illustrative process 700 for identifying content items available on a second content platform during a particular time period in accordance with some embodiments of the disclosure. Process 700 may be implemented on control circuitry 304. In addition, one or more actions of process 700 may be incorporated into or combined with one or more actions of any other process or embodiment described herein.

At 702, control circuitry 304 transmits a query to a content provider of the second content platform. The query includes a start time and an end time corresponding to the particular time period (e.g., the particular time period defined at either 614b or 614c above). In response to the query, control circuitry 304 receives, at 704, metadata corresponding to a plurality of content listings which in turn correspond to content items that will be available on the second content platform during the particular time period. At 706, control circuitry 304 initializes a counter variable N and sets its value to 0. At 708, control circuitry compares metadata of the $N^{th}$ content item available on the second content platform with content preference characteristics in the profile data 316. If the metadata of the $N^{th}$ content items matches the content preference characteristics in the profile data 316, then at 710, control circuitry 304 adds the $N^{th}$ content item to the second plurality of content items discussed above in connection with FIG. 4. At 712, control circuitry 304 determines whether there is metadata for additional content items to compare with the content preference characteristics. If so, then at 714, control circuitry 304 increments the value of the counter variable N, and processing returns to step 708.

The actions and descriptions of FIG. 7 may be used with any other embodiment of this disclosure. In addition, the actions and descriptions described in relation to FIG. 7 may be done in suitable alternative orders or in parallel to further the purposes of this disclosure.

Figure 8:
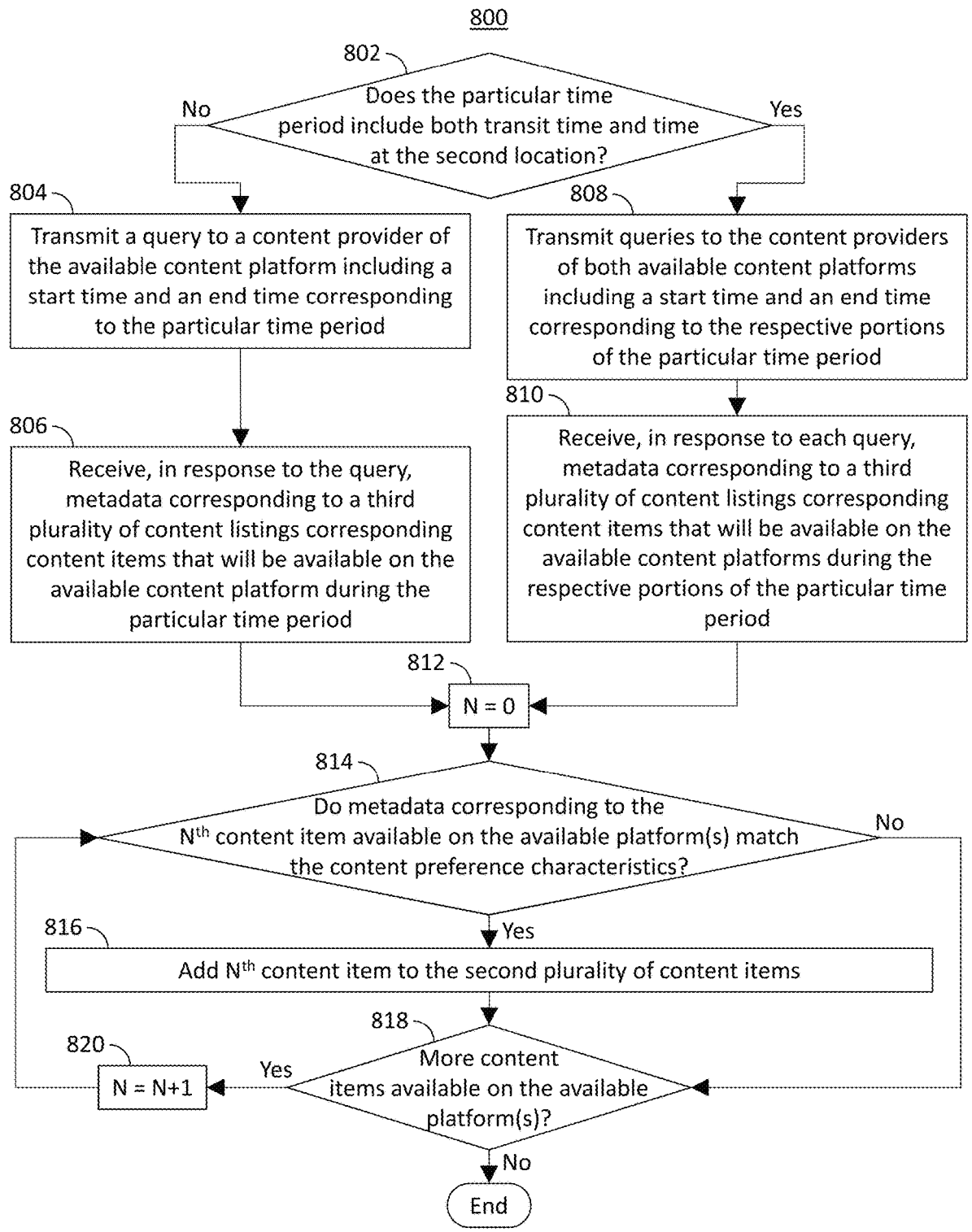
FIG. 8 is a flowchart representing a second process for identifying content items available multiple other content platforms during a particular time period in accordance with some embodiments of the disclosure.

FIG. 8 is a flowchart representing a second illustrative process 800 for identifying content items available on a second content platform during a particular time period in accordance with some embodiments of the disclosure. Process 800 may be implemented on control circuitry 304. In addition, one or more actions of process 800 may be incorporated into or combined with one or more actions of any other process or embodiment described herein.

At 802, control circuitry 304 determines whether the particular time period includes both transit time and time at the second location (i.e., the time period as defined at 614a above). If so, then at 804 control circuitry 304 transmits a query to a content provider of the available content platform, the query including a start time and an end time corresponding to the period of time, as described above in connection with FIG. 7. At 806, in response to the query, control circuitry 304 receives metadata corresponding to content items available on the content platform during the period of time, as described above in connection with FIG. 7.

If the particular time period does include both transit time and time at the second location, then at 808, control circuitry 304 transmits queries to content providers of both available content platforms, the query including a start time and an end time corresponding to the respective portions of the particular time period. For example, control circuitry 304 determines that a content platform will be available on a flight from New York to Dubai, and another content platform will be available at a hotel at which the user is staying Dubai. Control circuitry 304 defines the particular period of time as the time between departure from New York and departure from Dubai. Control circuitry 304 transmits separate queries to each of the content platforms for content that will be available during the time when the user will have access to the respective platform. If the flight from New York to Dubai departs at 9:02 AM Eastern Time on Mar. 5, 2019, and arrives in Dubai at 9:17 PM Eastern Time on Mar. 5, 2019 (6:17 AM Gulf Time on Mar. 6, 2019), control circuitry 304 requests, from the airline, metadata for content items available on the flight during that time. If the user is scheduled to spend a week in Dubai, control circuitry 304 requests, from the hotel, metadata for content items available in a seven day period beginning at 6:17 AM Gulf Time on Mar. 6, 2019. At 810, control circuitry 304 receives, in response to each query, metadata corresponding to a plurality of content items available on each content platform during the respective portions on the particular time period.

At 812, control circuitry 304 initializes a counter variable N and sets its value to 0. At 814, control circuitry compares metadata of the $N^{th}$ content item available on the second content platform with content preference characteristics in the profile data 316. If the metadata of the $N^{th}$ content items matches the content preference characteristics in the profile data 316, then at 716, control circuitry 304 adds the $N^{th}$ content item to the second plurality of content items discussed above in connection with FIG. 4. At 818, control circuitry 304 determines whether there is metadata for additional content items to compare with the content preference characteristics. If so, then at 820, control circuitry 304 increments the value of the counter variable N, and processing returns to step 814.

The actions and descriptions of FIG. 8 may be used with any other embodiment of this disclosure. In addition, the actions and descriptions described in relation to FIG. 8 may be done in suitable alternative orders or in parallel to further the purposes of this disclosure.

Figure 9:
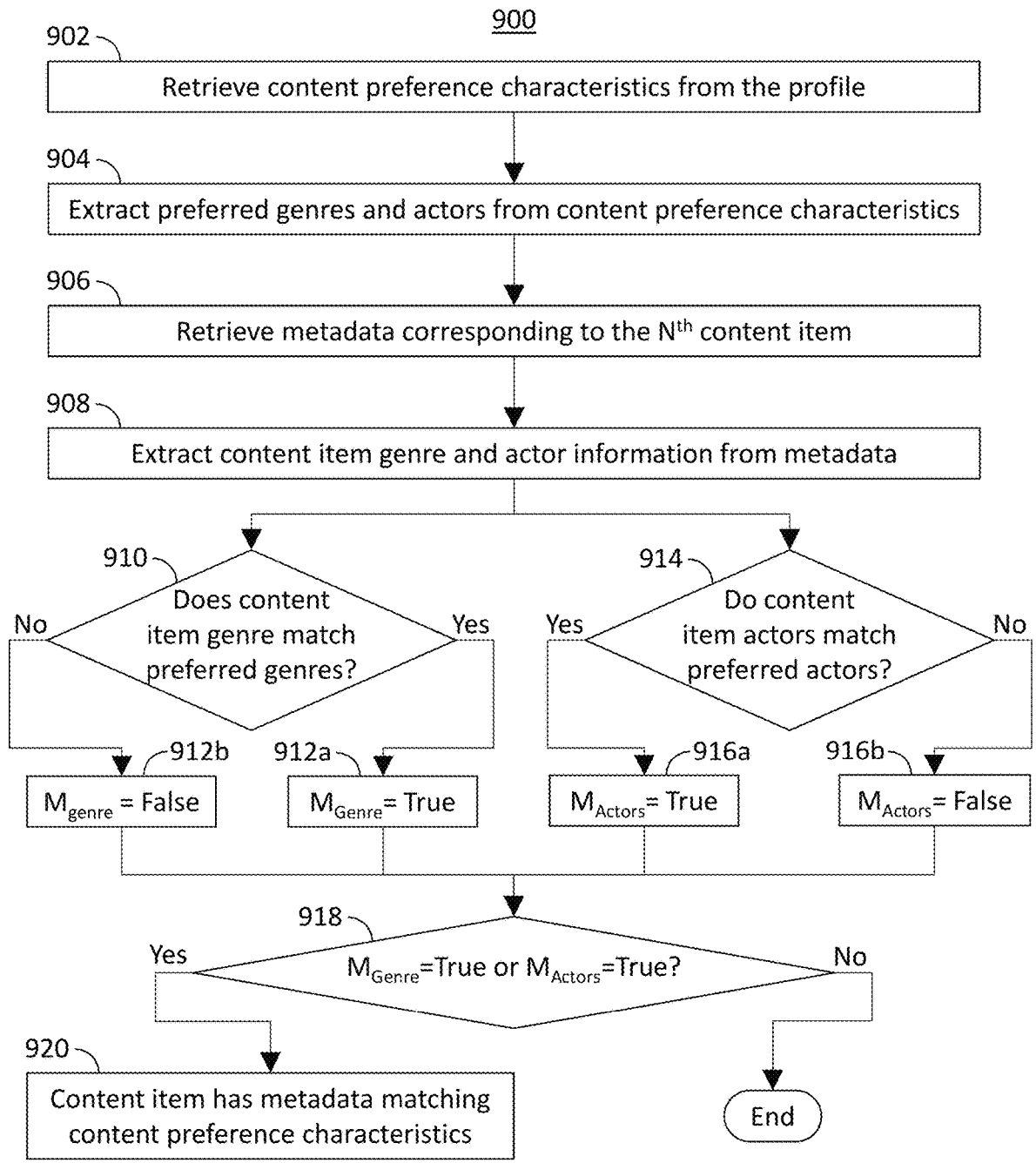
FIG. 9 is a flowchart representing a process for determining whether metadata corresponding to a content item matches content preference characteristics in accordance with some embodiments of the disclosure.

FIG. 9 is a flowchart representing an illustrative process 900 for determining whether metadata corresponding to a content item matches content preference characteristics in accordance with some embodiments of the disclosure. Process 900 may be implemented on control circuitry 304. In addition, one or more actions of process 900 may be incorporated into or combined with one or more actions of any other process or embodiment described herein.

At 902, control circuitry 304 retrieves content preference characteristics from the profile. The media device on which recommendation engine 300 is employed is associated with a profile on the first content platform. Control circuitry 304 may access locally-stored profile data. Alternatively, control circuitry 304 may query a profile database, such as profile database 314, for data corresponding to the profile associated with the media device. When associating a profile with the media device, at least one unique identifier of the profile is stored locally on the media device. Control circuitry 304 uses the unique identifier of the profile to construct a query to the profile database 314 for profile data corresponding to the profile.

At 904, control circuitry 304 extracts preferred genres and actors from content preference characteristics. The profile data received by control circuitry 304 includes preferences calculated based on the user's recent viewing history, as described above in connection with FIG. 2. Preferences 208 may include genres of content most often viewed by the user and actors who most often appeared in content viewed by the user. Control circuitry 304 identifies these preference data and extract them from the profile data.

At 906, control circuitry 304 retrieves metadata corresponding to the $N^{th}$ content item. This may be accomplished using methods described above in connection with FIG. 5. At 908, control circuitry 304 extracts genre and actor information from the metadata corresponding to a content item and, at 910, control circuitry 304 determines whether content item genre information matches preferred genres. Control circuitry 304 compares the preferred genre and actor information extracted from the profile data with the genre and actor information extracted from the metadata corresponding to the content item. If any preferred genre appears in the genre information of the content item, the content item genre is identified as matching the preferred genres. Similarly, if any preferred actor appears in the actors information of the content item, then content item actors are identifies as matching the preferred actors.

If the content items genre information matched the preferred genres then, at 912a, control circuitry 304 sets a genre flag $M_{Genre}$ to True. If not, then, at 912b, control circuitry 304 sets the $M_{Genre}$ flag to False. Similarly, at 914, control circuitry 304 determines whether content item actor information matches preferred actors. If so, then, at 916a, control circuitry 304 set an actors flag $M_{Actors}$ to True. If not, then, at 916b, control circuitry 304 set the $M_{Actors}$ flag to False.

At 918, control circuitry 304 determines whether either the $M_{Genre}$ or $M_{Actor}$ flag is set to True. If either flag is set to True, then at 920 control circuitry 304 determines that the $N^{th}$ content item has metadata matching the content preference characteristics. In some embodiments, recommendations include a match rating indicating how close a particular content item matches the content preference characteristics. If both the $M_{Genre}$ flag and the $M_{Actors}$ flag are True, a recommendation of the content item may include a higher match rating than a content item where only one flag is True. Additionally, multiple $M_{Actor}$ flags can be used to indicate more than one preferred actor appearing in a content item, which can also affect a match rating.

The actions and descriptions of FIG. 9 may be used with any other embodiment of this disclosure. In addition, the actions and descriptions described in relation to FIG. 9 may be done in suitable alternative orders or in parallel to further the purposes of this disclosure.

Figure 10:
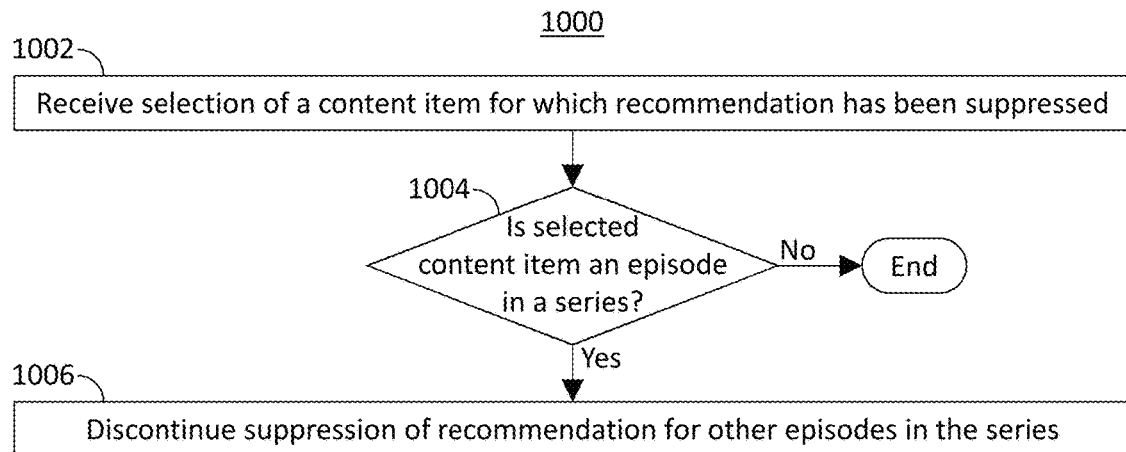
FIG. 10 is a flowchart representing a process for discontinuing suppression of recommendations for episodes in a series in accordance with some embodiments of the disclosure.

FIG. 10 is a flowchart representing an illustrative process 1000 for discontinuing suppression of recommendations for episodes in a series in accordance with some embodiments of the disclosure. Process 1000 may be implemented on control circuitry 304. In addition, one or more actions of process 1000 may be incorporated into or combined with one or more actions of any other process or embodiment described herein.

At 1002, control circuitry 304 receives, via input circuitry 302, selection of a content items for which recommendation has been suppressed. For example, recommendation engine 300 suppresses recommendation of content items by generating for display an overlay over content items available on the second content platform. The overlay may not prevent selection of the content item, and the user may choose to select the content item regardless of the overlay.

At 1004, control circuitry 304 determines whether the selected content item is an episode of a series. Control circuitry 304 accesses metadata corresponding to the selected content item which may include information such as a series identifier, episode number, or other information indicating that the selected content item is one member of a series. If the selected content item is an episode of a series, then, at 1006, control circuitry 304 discontinues suppression of recommendation for other episodes in the series. Control circuitry 304 may store, in a data structure, data indicating that recommendation of episodes of the series should not be suppressed, and control circuitry 304 may compare metadata of content items identified for recommendation with the data store in the data structure before suppressing recommendation of any content items. Control circuitry 304 may also remove any overlays generated or display over other episodes in the series. If display of suppressed recommendations has been altogether prevented, control circuitry 304 may update the displayed recommendations to include previously-suppressed episodes of the series.

The actions and descriptions of FIG. 10 may be used with any other embodiment of this disclosure. In addition, the actions and descriptions described in relation to FIG. 10 may be done in suitable alternative orders or in parallel to further the purposes of this disclosure.

Figure 11:
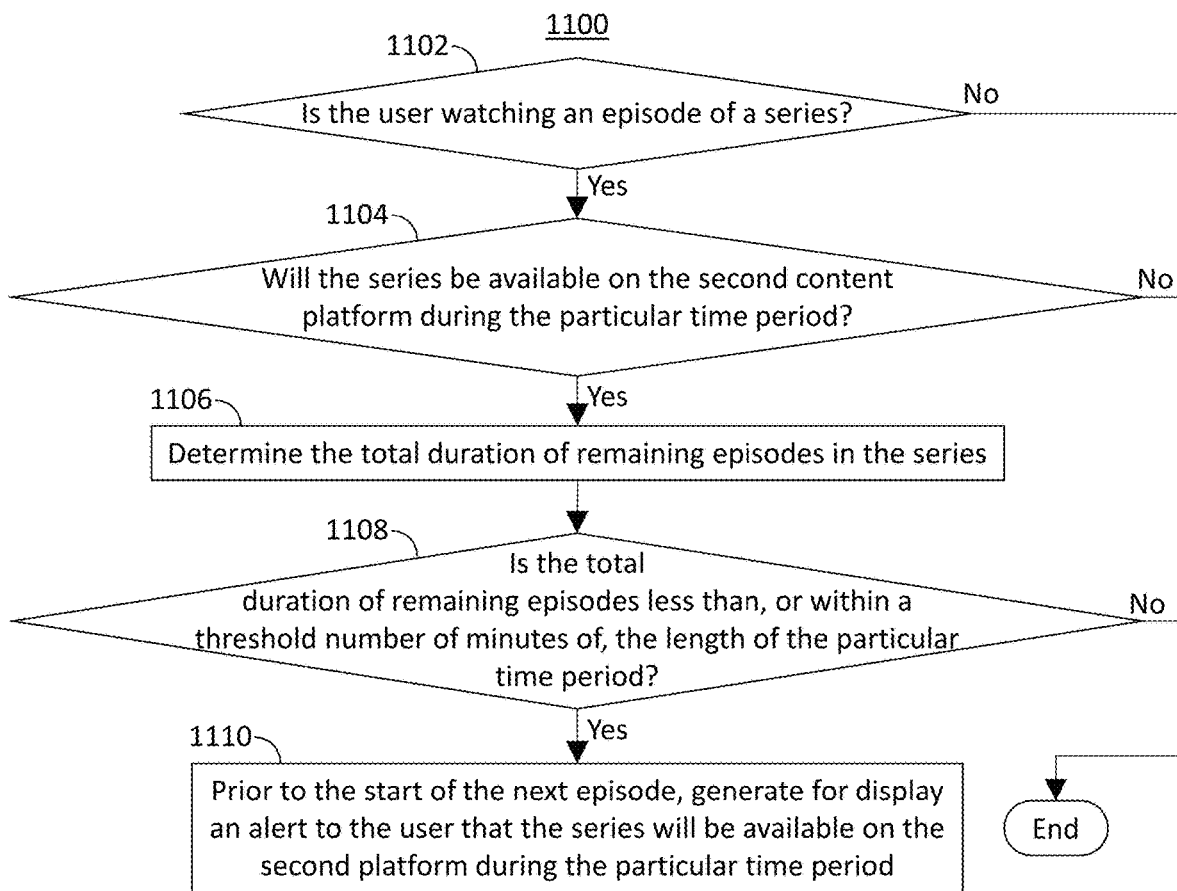
FIG. 11 is a flowchart representing a process for alerting a user to the availability of a series on a second content platform prior to the start of the next episode in the series in accordance with some embodiments of the disclosure.

FIG. 11 is a flowchart representing an illustrative process 1100 for alerting a user to the availability of a series on a second content platform prior to the start of the next episode in the series in accordance with some embodiments of the disclosure. Process 1100 may be implemented on control circuitry 304. In addition, one or more actions of process 1100 may be incorporated into or combined with one or more actions of any other process or embodiment described herein.

Sometimes users can "binge watch" entire series in a single sitting or over the course of only a few days. In some cases, the user may begin binge watching a series without knowing that the series will be available on the second platform during the particular period of time. At 1102, control circuitry 304 determines if the user is watching an episode of a series. Control circuitry 304 accesses metadata corresponding to the content item currently being watched on the media device on which recommendation engine 300 is employed. If the user is watching an episode of a series, then, at 1104, control circuitry 304 determines whether the series will be available on the second content platform during the particular time period. This may be accomplished using methods described above in connection with FIG. 4 for determining whether a single content item will be available on the second content platform.

If the series will be available on the second content platform during the particular time period, then, at 1106, control circuitry determines the total duration of the remaining episodes in the series. Control circuitry 304 queries the first content platform for runtime data for all episodes of the series which come after the episode currently being watched. In some cases only one season of the series may be available on the second content platform during the particular time period. If the episode currently being watched is an episode of the season that will be available on the second content platform during the particular time period, control circuitry 304 queries the first content platform for runtime data for all episodes of that season of the series which come after the episode currently being watched. Control circuitry 304 adds the runtime of each of the remaining episodes together to determine the total duration of all remaining episodes which will be available on the second content platform during the particular time period.

At 1108, control circuitry 304 determines whether the total duration of the remaining episodes is less than, or within a threshold number of minutes of, the length of the particular time period. Control circuitry 304 compares the length of the particular time period with the total duration of the remaining episodes to determine whether the user will have sufficient time to watch all the remaining episodes during the particular time period. A total duration that is less than the length of the particular time period indicates that the user can watch all the remaining episodes during transit or on vacation and may therefore wish to save the remaining episodes to watch at that time. A total duration that is within a threshold number of minutes more or less than the length of the particular time period, such as the average length of the end credits of each episode, or less than 25% of the average length of each episode may also indicate that the user might wish to save the remaining episodes.

If the total duration of the remaining episodes is less than, or within a threshold number of minutes of, the length of the particular time period, then, at 1110, prior to the start of the next episode, control circuitry 304 generates for display an alert to the user that the series will be available on the second platform during the particular time period. This offers the user the opportunity to save the remaining episodes to watch during the particular time period.

The actions and descriptions of FIG. 11 may be user with any other embodiment of this disclosure. In addition, the actions and descriptions described in relation to FIG. 11 may be done in suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   identifying a first content platform associated with a profile;
   identifying a first plurality of content items available on the first content platform;
   determining a second content platform that will be associated with the profile during a particular time period;
   identifying a second plurality of content items that will be available on the second content platform during the particular time period;
   in response to identifying at least one content item available on the first content platform and included in the second plurality of content items that will be available on the second content platform during the particular time period:
      generating for display a plurality of recommendations for the profile on the first content platform including a recommendation for the at least one content item, wherein generating for display the plurality of recommendations on the first content platform comprises:
         suppressing the recommendation of the at least one content item by causing a visual indicator to be overlaid on a visual element corresponding to the at least one content item, wherein the visual indicator indicates an availability of the at least one content item on the second content platform; and
         declining to cause visual indicators to be overlaid on visual elements respectively associated with recommendations of content items in the first plurality of content items that are not available on the second content platform, to distinguish the recommendation of the at least one content item from the recommendations of the content items in the first plurality of content items that are not available on the second content platform.

2. The method of claim 1, wherein identifying the first plurality of content items available on the first content platform comprises:
   retrieving metadata corresponding to a third plurality of content items available from a content provider of the first content platform;
   comparing respective metadata of each content item of the third plurality of content items with content preference characteristics in the profile; and
   identifying as the first plurality of content items a subset of the third plurality of content items based on the comparing.

3. The method of claim 1, wherein the second content platform is different from the first content platform, the method further comprising determining whether the first content platform is available during the particular time period, wherein the suppressing and the declining is performed in response to determining that the first content platform is not available during the particular time period.

4. The method of claim 1, further comprising:
   accessing calendar data associated with the profile;
   identifying, based on the calendar data, an arrival time at a location and a departure time from the location; and
   defining the particular time period as a period of time between the arrival time and the departure time.

5. The method of claim 1, wherein determining the second content platform that will be associated with the profile during the particular time period comprises:
   accessing calendar data associated with the profile;
   identifying, based on the calendar data, a departure time from a first location and an arrival time at a second location; and
   identifying as the second content platform a content platform available during transit between the first location and the second location.

6. The method of claim 1, wherein identifying the second plurality of content items that will be available on the second content platform during the particular time period comprises:
   transmitting a query to a content provider of the second content platform; the query including a start time and an end time corresponding to the particular time period;
   receiving, in response to the query, metadata corresponding to a third plurality of content items that will be available on the second content platform during the particular time period;
   comparing respective metadata of each content item of the third plurality of content items with content preference characteristics in the profile; and
   identifying as the second plurality of content items a subset of the third plurality of content items based on the comparing.

7. The method of claim 1, wherein identifying the at least one content item available on the first content platform that will be available on the second content platform during the particular time period comprises:
  comparing the first plurality of content items with the second plurality of content items; and
  determining a subset of the first plurality of content items corresponding to content items of the second plurality of content items.

8. The method of claim 1, further comprising:
  receiving a selection of the visual element corresponding to the recommendation of the at least one content item; and
  generating for display a notification that the at least one content item associated with the selected visual element will be available on the second content platform during the particular time period.

9. The method of claim 1, wherein the visual indicator does not prevent selection of the visual element corresponding to the at least one content item.

10. The method of claim 9, further comprising:
  receiving selection of the visual element corresponding to the at least one content item; and
  based on receiving the selection of the visual element corresponding to the at least one content item, causing the at least one content item to be provided for display on the first content platform despite the visual indicator being overlaid on the visual element corresponding to the at least one content item.

11. A system comprising a memory; and
control circuitry configured to:
  identify a first content platform associated with a profile;
  identify a first plurality of content items available on the first content platform;
  determine a second content platform that will be associated with the profile during a particular time period;
  identify a second plurality of content items that will be available on the second content platform during the particular time period;
  in response to identifying at least one content item available on the first content platform and included in the second plurality of content items that will be available on the second content platform during the particular time period:
    generate for display a plurality of recommendations for the profile on the first content platform including a recommendation for the at least one content item, wherein generating for display the plurality of recommendations on the first content platform comprises:
      suppress the recommendation of the at least one content item by causing a visual indicator to be overlaid on a visual element corresponding to the at least one content item, wherein the visual indicator indicates an availability of the at least one content item on the second content platform; and
      decline to cause visual indicators to be overlaid on visual elements respectively associated with recommendations of content items in the first plurality of content items that are not available on the second content platform, to distinguish the recommendation of the at least one content item from the recommendations of the content items in the first plurality of content items that are not available on the second content platform.

12. The system of claim 11, wherein the control circuitry is configured to identify the first plurality of content items available on the first content platform by:
  retrieving metadata corresponding to a third plurality of content items available from a content provider of the first content platform;
  comparing respective metadata of each content item of the third plurality of content items with content preference characteristics in the profile; and
  identifying as the first plurality of content items a subset of the third plurality of content items based on the comparing.

13. The system of claim 11, wherein the second content platform is different from the first content platform, wherein the control circuitry is further configured to determine whether the first content platform is available during the particular time period, and wherein the suppressing and the declining is performed in response to determining that the first content platform is not available during the particular time period.

14. The system of claim 11, wherein the control circuitry is further configured to:
  access calendar data associated with the profile;
  identify, based on the calendar data, an arrival time at a location and a departure time from the location; and
  define the particular time period as a period of time between the arrival time and the departure time.

15. The system of claim 11, wherein the control circuitry is configured to determine the second content platform that will be associated with the profile during the particular time period by:
  accessing calendar data associated with the profile;
  identifying, based on the calendar data, a departure time from a first location and an arrival time at a second location; and
  identifying as the second content platform a content platform available during transit between the first location and the second location.

16. The system of claim 11, wherein the control circuitry is configured to identify the second plurality of content items that will be available on the second content platform during the particular time period by:
  transmitting a query to a content provider of the second content platform; the query including a start time and an end time corresponding to the particular time period;
  receiving, in response to the query, metadata corresponding to a third plurality of content items that will be available on the second content platform during the particular time period;
  comparing respective metadata of each content item of the third plurality of content items with content preference characteristics in the profile; and
  identifying as the second plurality of content items a subset of the third plurality of content items based on the comparing.

17. The system of claim 11, wherein the control circuitry is configured to identify the at least one content item available on the first content platform that will be available on the second content platform during the particular time period by:
  comparing the first plurality of content items with the second plurality of content items; and determining a subset of the first plurality of content items corresponding to content items of the second plurality of content items.

18. The system of claim 11, wherein the control circuitry is further configured to:
receive a selection of the visual element corresponding to the recommendation of the at least one content item; and
generate for display a notification that the at least one content item associated with the selected visual element will be available on the second content platform during the particular time period.

19. The system of claim 11, wherein the visual indicator does not prevent selection of the visual element corresponding to the at least one content item.

20. The system of claim 19, wherein the control circuitry is further configured to:
receive a selection of the visual element corresponding to the at least one content item; and
based on receiving the selection of the visual element corresponding to the at least one content item, cause the at least one content item to be provided for display on the first content platform despite the visual indicator being overlaid on the visual element corresponding to the at least one content item.

* * * * *